(12) United States Patent
Pragada et al.

(10) Patent No.: US 9,747,349 B2
(45) Date of Patent: Aug. 29, 2017

(54) SYSTEM AND METHOD FOR DISTRIBUTING QUERIES TO A GROUP OF DATABASES AND EXPEDITING DATA ACCESS

(75) Inventors: Sreenivasa Rao Pragada, Tarrytown, NY (US); Viswanath Dasari, Alpharetta, GA (US); Abhijit A Patil, Atlanta, GA (US)

(73) Assignee: Execue, Inc., Tarrytown, NY (US)

( * ) Notice: Subject to any disclaimer, the term of this patent is extended or adjusted under 35 U.S.C. 154(b) by 1228 days.

(21) Appl. No.: 11/929,789

(22) Filed: Oct. 30, 2007

(65) Prior Publication Data

US 2008/0104089 A1 May 1, 2008

Related U.S. Application Data

(60) Provisional application No. 60/863,801, filed on Oct. 31, 2006, provisional application No. 60/855,321, filed on Oct. 30, 2006.

(51) Int. Cl.
*G06F 17/30* (2006.01)
*G06F 7/00* (2006.01)

(52) U.S. Cl.
CPC .. *G06F 17/30545* (2013.01); *G06F 17/30592* (2013.01)

(58) Field of Classification Search
CPC ................................................ G06F 17/30545
USPC ........................................ 707/999.102, 802
See application file for complete search history.

(56) References Cited

U.S. PATENT DOCUMENTS

| 5,418,945 | A  | * | 5/1995  | Carter et al.               |
|-----------|----|---|---------|-----------------------------|
| 5,870,739 | A  | * | 2/1999  | Davis et al.                |
| 5,991,735 | A  | * | 11/1999 | Gerace ............... 705/7.33 |
| 6,192,370 | B1 | * | 2/2001  | Primsch ............ 707/103 R |
| 7,194,465 | B1 | * | 3/2007  | MacGregor ... G06F 17/30536 |
| 7,315,849 | B2 | * | 1/2008  | Bakalash et al.             |
| 7,324,991 | B1 | * | 1/2008  | Anjur ..................... 707/5 |
| 2002/0169658 | A1 | * | 11/2002 | Adler ...................... 705/10 |
| 2003/0033179 | A1 |   | 2/2003  | Katz et al.                 |
| 2003/0084043 | A1 | * | 5/2003  | Acharya et al. .......... 707/5 |
| 2004/0034616 | A1 | * | 2/2004  | Witkowski et al. ....... 707/1 |
| 2005/0203881 | A1 | * | 9/2005  | Sakamoto et al. ........ 707/3 |

(Continued)

*Primary Examiner* — Kuen Lu
(74) *Attorney, Agent, or Firm* — Gordon Kessler (57) ABSTRACT

Systems, methods, and computer readable media for expediting data access. The method embodiment may comprise the steps returning a result to a query for information requested from a hybrid database. The hybrid database may be constructed by: (1) identifying source member databases where query acceleration is required, and for each of the identified source member databases, performing the following steps: (2) identifying common dimensions or grouping patterns, (3) creating sets of commonly occurring common dimensions, (4) building multi-dimensional databases, (5) building one or more sampled databases, (6) compacting the sampled databases into a master sampled database, (7) building a hybrid database metadata repository combining metadata from the master sampled database and the one or more multi-dimensional databases, together referred to as an answers catalog, and source member databases, and (8) building a query governor to federate the query to the source member databases and their associated answers catalogs.

7 Claims, 8 Drawing Sheets

(56) References Cited

U.S. PATENT DOCUMENTS

| | | |
|---|---|---|
| 2005/0228803 A1 | 10/2005 | Farmer et al. |
| 2005/0240580 A1* | 10/2005 | Zamir ............... G06F 17/30867 |
| 2005/0246357 A1* | 11/2005 | Geary et al. .................. 707/100 |
| 2006/0010113 A1* | 1/2006 | Berger .............. G06F 17/30592 |
| 2006/0155697 A1* | 7/2006 | Rosengard ........................ 707/6 |
| 2006/0178918 A1* | 8/2006 | Mikurak ........................... 705/7 |
| 2006/0212486 A1 | 9/2006 | Kennis et al. |
| 2007/0027904 A1* | 2/2007 | Chow et al. .................. 707/102 |
| 2007/0156677 A1* | 7/2007 | Szabo ............... G06F 17/30522 |
| 2007/0208730 A1* | 9/2007 | Agichtein et al. ................ 707/5 |
| 2007/0244865 A1* | 10/2007 | Gordon et al. .................. 707/3 |
| 2009/0083276 A1* | 3/2009 | Barsness et al. ............... 707/10 |

\* cited by examiner

SYSTEM AND METHOD FOR DISTRIBUTING QUERIES TO A GROUP OF DATABASES AND EXPEDITING DATA ACCESS

PRIORITY CLAIM

The present invention claims the benefit of U.S. Provisional Application No. 60/863,801, filed Oct. 31, 2006, the content of which is incorporated herein by reference in its entirety. The present application also claims the benefit U.S. Provisional Application No. 60/855,321, filed Oct. 30, 2006, the content of which is incorporated herein by reference in its entirety.

BACKGROUND OF THE INVENTION

1. Field of the Invention

The present invention relates generally to database queries and more specifically to expediting database query results by dynamically querying a combination of multi-dimensional databases, fractional databases, or data warehouses for fast data analysis.

2. Introduction

A common method of obtaining information from a database is to perform a database search. Google.com is an example of a well-known website that enables users to perform searches across large databases and retrieve results. Searching databases may be performed in a number of ways. For example, a business intelligence company may need to query a specific set of databases that contain large amounts of data for a particular search. In some cases, the amount of information is quite large and search results could be desired quickly. While querying large databases or warehouses can offer accurate results, performing the query can be time consuming and may not be useful when immediate query results are needed. The time necessary to perform a full search of a database or group of databases to produce results of a certain level of accuracy may take longer that the user desires and provide results that are more accurate than what is actually needed.

Several approaches have been used to seek solutions to provide quicker query results. Multi-dimensional databases (MDDBs) and sampled databases are common solutions for expediting query results. In addition, software and/or hardware driven parallel computing technologies are also used to improve database performance.

MDDBs may be referred to as summary cubes. MDDBs are created by captured common statistics or common business metrics (also referred to as measures) across common business groupings (also referred to dimensions). Common dimensions or grouping patters may be identified so derived member databases (data cubes) are constructed to optimize at least one parameter, such as query response times. A measure is a business metrics or a measure attributes. In the case of MDDB, common statistics are applied on the selected measures. A Dimension is a grouping attribute. In the case of a MDDB, common measures are aggregated across frequently used dimensions. A fractional or sampled or approximate database (FxDB) (also known as a data mart) is built by taking representative sample of a larger database. As the name suggests, the results from sampled databases will necessarily be approximate. A data warehouse (DW) is a Full Databases (FullDB) containing all the available information in a database or group of databases.

MDDBs address the challenge of immediate access to data by pre-computing a variety of measure attribute statistics across a number of common grouping attributes. The grouping attributes are also referred to as dimensions and measures attributes are referred to simply as measures in the context of MDDBs. However, MDDBs are typically most effective for data analysis only within the predefined dimensions and their member groupings. Users often revert to time consuming querying of large databases whenever database results are required across categories different from predefined member groupings available in MDDBs. Users sometimes resort to adding more number of dimensions to address part of these challenges which in turn results in very large or unmanageable MDDBs which also could defeat the purpose of immediate data access.

Approximate or sampled databases are another alternative to expediting data access. Sampled databases address the challenges of predefined groupings as the detailed data within it can be grouped exactly like its original databases. Sampled databases can be pre-built to offer approximate results within a desired level of accuracy for most queries and may not be effective for detailed queries resulting in few rows compared to original results.

Often multiple sampled databases are built to address different functions in a business. Each of these sampled databases could be built with a focus on the common groupings within that function, for example, marketing may focus on program or campaign tracking while risk management may focus on portfolio wide risk metrics with different groupings or dimensions in each. One of skill in the art should appreciate that building one large sampled database with all the possible groupings could result in a sample size that is too large, defeating the purpose of a sampled database. Multiple sampled databases built to focus on frequent sets of grouping attributes can result in duplication of databases records across sampled databases, which may lead to wasted storage space due to unnecessary duplication or may lead to data inconsistencies.

Sourcing samples dynamically to meet desired accuracy levels can address the challenge of volatility of approximate answers from pre-built sampled databases but can be more time consuming than querying pre-built sampled databases. Accordingly, what is needed in the art is an improved method for improving database searching such that expedited results are provided at an appropriate level of accuracy.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed herein are systems, methods, and computer readable media for distributing queries to a group of databases and expediting data access. An exemplary method embodiment of the invention includes receiving a query for information from one or more databases, and returning a result to the query for information requested in the query from a hybrid database, the hybrid database being constructed by the steps including: (1) identifying one or more source member databases where query acceleration is required, (2) identifying one or more common dimensions or grouping patterns in a plurality of databases, (3) creating one or more sets of commonly occurring common dimensions, (4) building one or more multi-dimensional databases using the one or more sets of commonly occurring common dimensions, (5) building one or more fractional databases, (6) compacting the one or more fractional databases into a master fractional database, (7) building a hybrid database metadata repository combining metadata from the master fractional database and the one or more multi-dimensional databases and source member databases together referred to as derived member databases, and (8) building a query governor to interface between the query, the hybrid database metadata repository, the plurality of databases, the master fractional database, and the one or more multi-dimensional databases.

The principles of the invention may be utilized to provide expedited results to queries across one or more databases.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
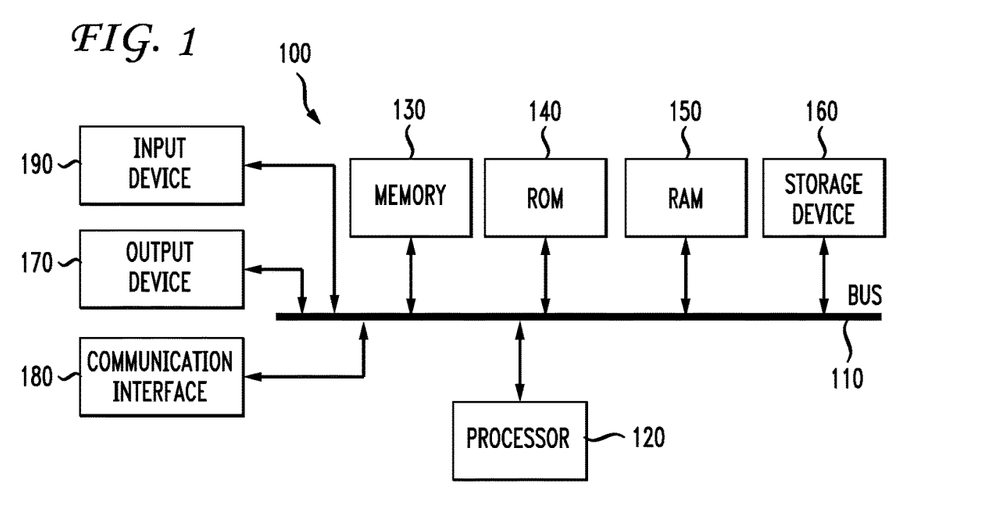
FIG. 1 illustrates a basic system or computing device embodiment of the invention.

With reference to FIG. 1, an exemplary system for implementing the invention includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS), containing the basic routine that helps to transfer information between elements within the computing device 100, such as during start-up, is typically stored in ROM 140. The computing device 100 further includes storage means such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch sensitive screen for gesture or graphical input, keyboard, mouse, motion input, speech and so forth. The input may be used by the presenter to indicate the beginning of a speech search query. The device output 170 can also be one or more of a number of output means. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative embodiment of the present invention is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (RO for storing software performing the operations discussed below, and random access memory (RAM) for storing results. Very large scale integration (VLSI) hardware embodiments, as well as custom VLSI circuitry in combination with a general purpose DSP circuit, may also be provided.

The present invention addresses a system and method for distributing queries to a group of databases and expedited data access process. In general, there are several things that are needed in terms of database searches if one has a large database and there is information associated with the usage meaning and what kinds of queries have been submitted in the past to the database. The system can study the pattern of those queries and build several data cubes and/or data marts that can quickly provide the answers to those questions. A data cube is typically contains a reduced number of records from the source database according to query histories. A data mart is preferably generated in addition to a data cube and represents a sampling of the source database. So if the data cube cannot answer the query, then a data mart, or sampling of the source database may be accessed. The data cubes and data marts may be jointly termed an "answer catalog." The system can access these data cubes and data marts to present the answer very quickly. For example, if there is a database having 300,000,000 records, when a query is submitted wherein the person sending the query desires to see an average salary by state and by race. As an example, assuming there are ten races for 50 states thus resulting in an approximate expected return of 500 records. A data cube may represent a summarized data mart of whether the groupings are predetermined. For example, assume the data cube with a state as a dimension and a race as a dimension, such a data cube will have 500 records. That data cube because it only has 500 records, may be easily and quickly accessed as opposed to the original source database of 300,000,000 records. In this regard, the performance will be greatly improved. So as a general concept disclosed herein, the system is seeking to provide an increased and quick access for questions that were submitted to a source database but wherein the system has found out what kinds of groupings are commonly appearing that enables it to build several data cubes representing each of the groupings. In this regard, when queries are submitted in the future, the system goes to the data cube to access the answer immediately.

Accessing generated data cubes and data marts, as well as the original source database may be done in a "waterfall" fashion. When a query arrives, the system first determines whether the data cubes can address the question, if not, then the system utilizes the data marts or sampling of the database. The system, if necessary, may then dynamically boost a sample of the source database by dynamically sampling and then finally if a sufficient accuracy cannot be obtained, the system may query the entire source database. In this regard, the system may be able to answer 60% of questions only accessing the data cubes, perhaps using the fractional databases or data marts answers an additional 15% of the question, and a dynamic sampling approach increases that another 15% until finally only 10% of the queries are answered via searching the entire source database.

In one aspect, if a query is submitted that is not available in the data cube, the system will sample the 300,000,000 records and pull, say a 2% sample that can present a fairly reasonable robust answer. Because in such a scenario only a 2% sample is provided, there may be only a 92-96% confidence level in the answer. However, if the user desires 99% accuracy, then further querying would be required on the source database to provide that accuracy. In one solution, the system provides a mechanism where additional samples may be drawn from the source database as required to meet the 99% accuracy requirement. This is what is disclosed herein as dynamic sampling.

Figure 2A:
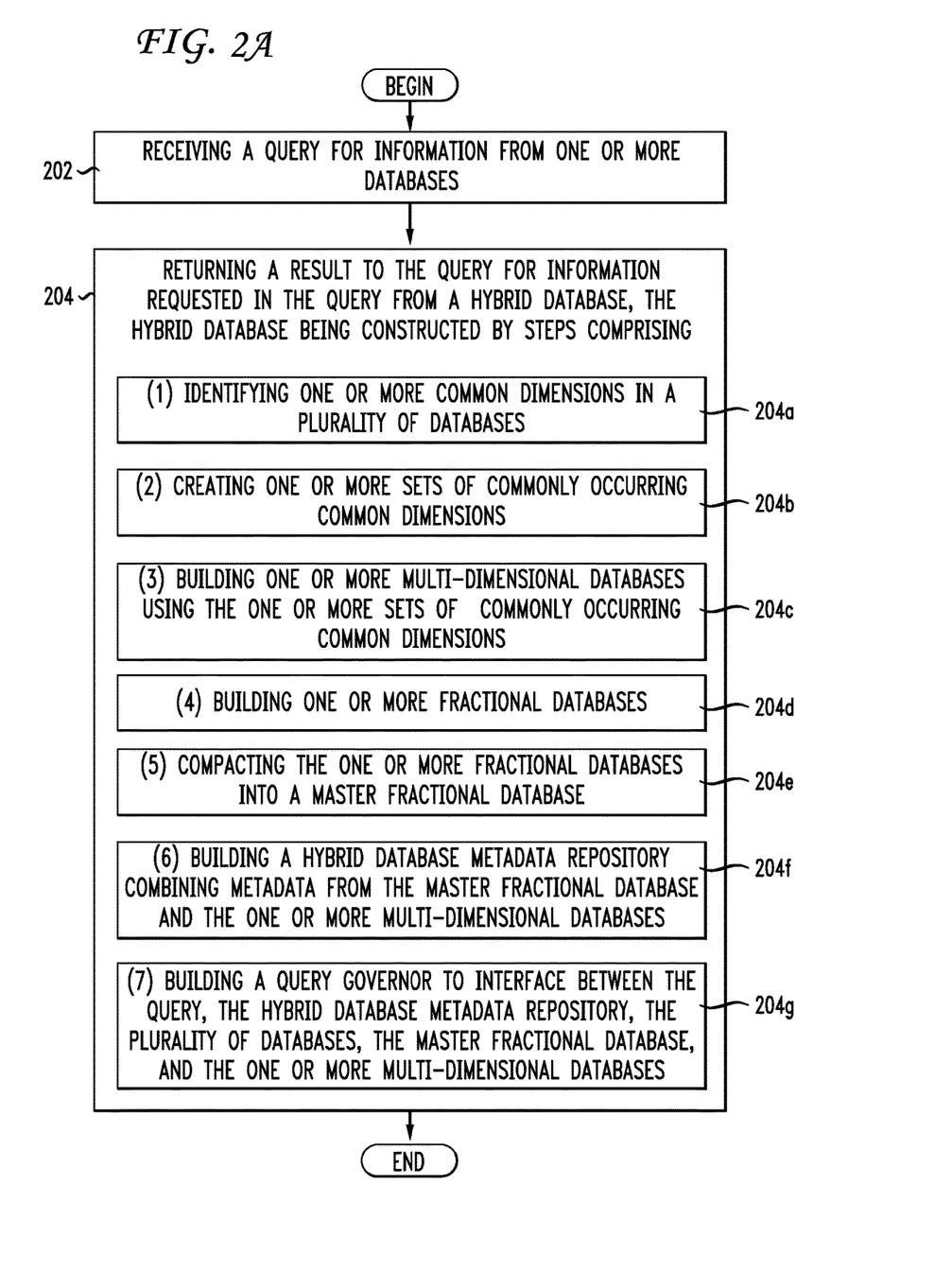
FIG. 2A illustrates a method embodiment of the invention.

FIG. 2A illustrates a method embodiment of the invention. First, the method receives a query for information from one or more databases (202). The one or more databases may be individually visible or accessible to the user, or they may be accessible only as a conglomerate hybrid database. The query may also include a desired level of accuracy of the results. The initial query may be a formal structured query or converted from a natural language query or form based querying interface. Next a result is returned to the query from a hybrid database (204). The hybrid database is constructed according to the following steps: identifying one or more common dimensions in a plurality of databases (204a) and creating one or more sets of commonly occurring common dimensions (204b). Example dimensions include state, race, income level, or any other parameter that may be used to describe data in the database. Next, the method includes building one or more multi-dimensional databases using the one or more sets of commonly occurring common dimensions (204c), building one or more fractional databases (204d), compacting the one or more fractional databases into a master fractional database (204e), building a hybrid database metadata repository combining metadata from the master fractional database and the one or more multi-dimensional databases and the source databases (204f), and building a query governor to interface between the query, the hybrid database metadata repository, the plurality of databases, the master fractional database, and the one or more multi-dimensional databases (204g). Compacting the one or more fractional databases when constructing the hybrid database is achieved by slice numbering each sample in a full database, and building a plurality of fractional databases by selecting samples starting from the same slice umber to maximize record overlap across the plurality of fractional databases.

Another way of describing the approach above is using the terms data cube for the multidimensional databases and data marts for the fractional databases.

Figure 2B:
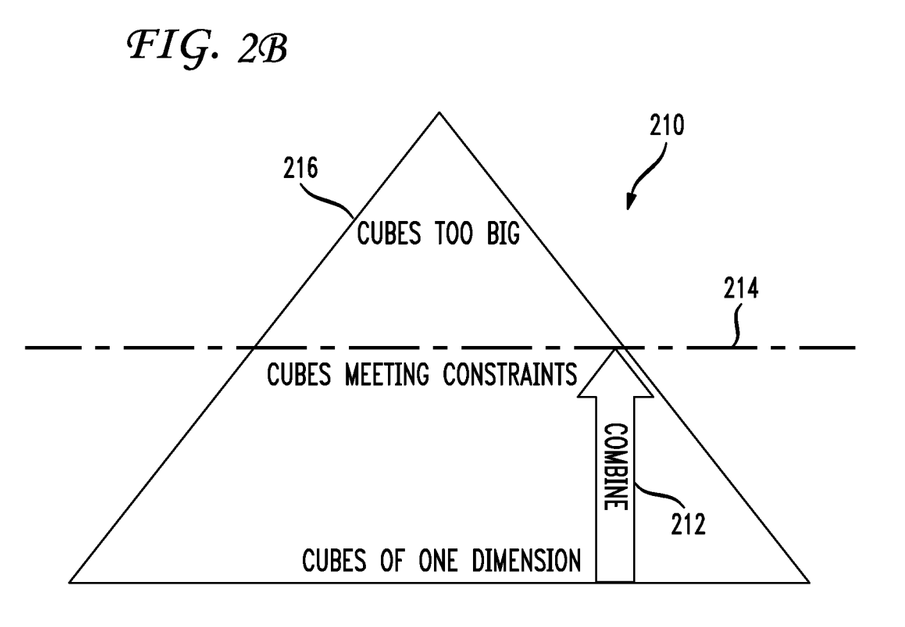
FIG. 2B illustrates an approach of identify a set of common groupings or dimension sets which is optimal within preset constraints

FIG. 2B illustrates an approach of identifying optimal sets of dimension sets for the purpose of iterating a MDDB and/or sample data marks. An optimal set of grouping candidates, which may be defined by potential constraints, can be identified based on past or ongoing usage. Usage, a key input, can be a log of historical queries from a user. A number of constraints which may be used for identifying an optimal set of grouping candidates can be determined by systems, a client, and possible users and may be applied to meet computational, storage and response time goals in the HyDB system. The following illustrates several possible constraints and demonstrating the user of such constraints. For example: (1) Maximum number of dimensions in a dimension set or cube. (2) Maximum number of combinations in a cube, additional constraints like a) number of combinations, in any given derived data asset, not more than 2-5% of the detail records of its source data assets and b) number of combinations, in any given derived data asset <1,000,000 or some other absolute number; set by administrator, (3) maximum number of dimension sets, (4) maximum percentage coverage of historical usage, the goal, and (5) storage size of overall HyDB not more than 5% of source data assets. Preferably, the constraints are applied to optimize at least one parameter such as query response time, member database size, and so forth.

Pyramid 210 is shown in FIG. 2B and generally illustrates the process of identifying optimal sets of grouping candidates for the purpose of developing an MDDB and/or sample data mart. The output is an optimal grouping of candidates that is output as a list of dimension sets with each dimension set resulting in an MDDB and/or a sample data mart. The optimal sets of grouping candidates may be based on an optimization parameter such as to achieve a quickest query response time.

An example algorithm for performing the process illustrated in the FIG. 2B is to build optimal dimension sets from the ground up by combining 212 individual dimensions based on frequency or popularity of the combinations. The process is stopped when no new cubes can be built within the constraints. Example constraints are noted above. In a preferred aspect, the algorithm starts with a list of dimensioned and identifies members in each. The system gathers these lists by simple reviewing of the group-by clause. Alternately, the system may apply other principles to find prudential grouping candidates from a given query. To speech up this process, queries may be run on a sample data mart as opposed to the full data warehouse. Next, the algorithm selects all individual dimensions to begin with. The system iterates the following steps n−1 times, n being the constraints determining the maximum number of dimensions. For iterations i=2 to n: (1) List all possible cubes with number of dimensions that are of size I, (2) select cube if i.) it matches part-usage-pattern, ii) it helps reaching the goal of answering a preset percent of all past queries using these cubes, iii) the new cube is within the constraints, iv) drop all subset cubes of the newly selected cube, and v) stop when no new cubes can be added or iterations are complete. Line 214 illustrates the conclusion of when no new cubes are added or combined and the iterations are essentially complete and the resulting cubes 216 are output and used according to the invention.

A compact FxDB is built by combining multiple FxDBs and removing any common database rows. The following three steps illustrate the method of creating FxDBs and compacting them into a compact FxDB.

If two or more FxDBs exist, then could be an opportunity to compact them into one FxDB containing fewer database records than in the individual FxDBs separately. For instance, consider two FxDBs with say 2% sample of the full database. Then in the best case, both FxDB contain the same 2% sample therefore compacting results half the number of database records than in the two of them separately. On the other hand, the two FxDBs can contain different 2% samples and, in such case, compacting would not yield any benefit.

Figure 3:
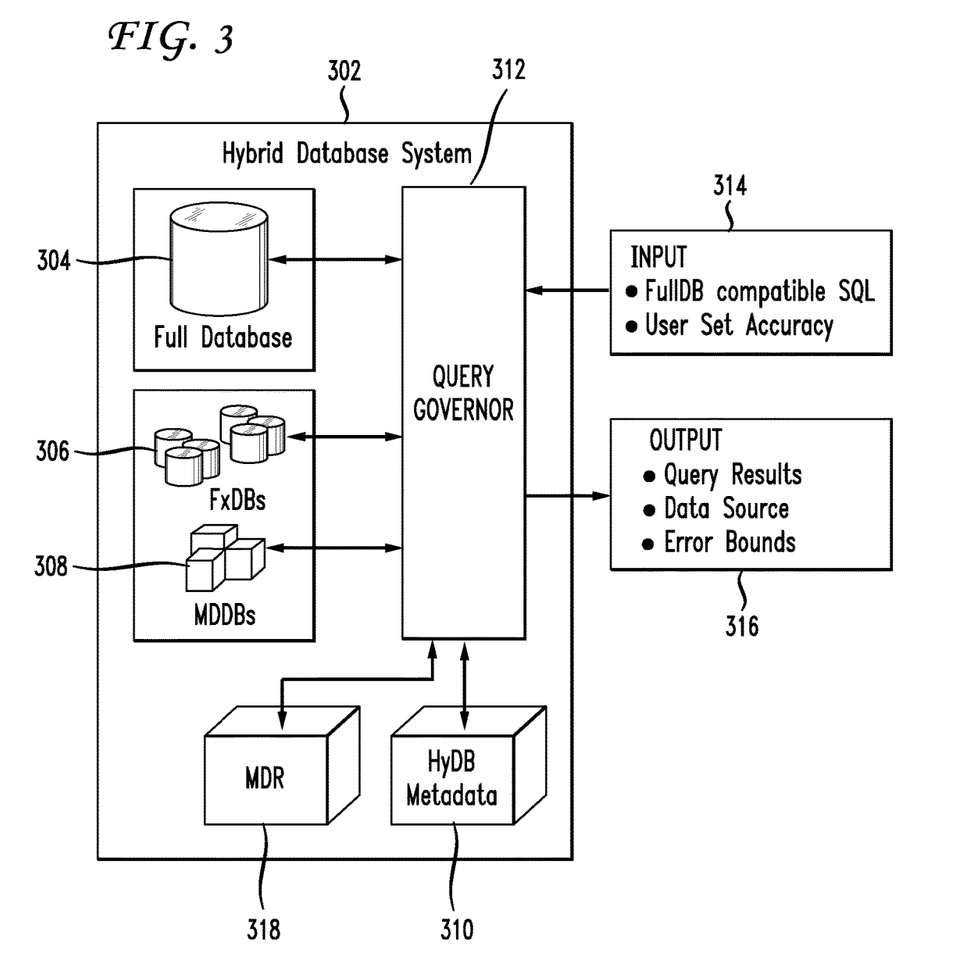
FIG. 3 illustrates sample hybrid database.

FIG. 3 illustrates sample hybrid database system. The hybrid database system 302 is composed of full databases 304, fractional databases 306, multi-dimensional databases 308, hybrid database metadata 310, and a query governor 312. The multi-dimensional databases are created by identifying one or more common dimensions in the full databases and combining the common dimensions that frequently occur or are likely to be requested. Fractional databases are subsets or representative sample of complete databases. The Hybrid Database Metadata is a repository for metadata from the fractional and multi-dimensional databases and source databases.

A source database or a source member database is preferably a detailed database or record level database or warehouse.

The metadata repository stores common metadata information or member databases and also stores selective data elements to determine if a member database can answer a user query by just reviewing only the metadata dictionary without querying all the physical member databases at query time. To do so, the metadata repository also stores the actual members of lookup tables. Therefore, a determination if a member database can answer a question like "Sales for Platinum Product" can be made by reviewing metadata only—specifically, without querying the actual member databases which can be more time consuming.

A metadata repository (MDR) 318 allows for capturing metadata of all HyDB data assets into a MDR. The MDR 318 enables the query governor to find all data assets that can potentially answer a given query by just reviewing the metadata without accessing the actual data assets. To do so, the MDR 318 typically captures two pieces of information about all data assets: (1) metadata of all data source entities like tables and columns (2) actual lookup data of lookup attributes like STATE with values like New York, North Carolina, Georgia, etc. or PRODUCT like Gold, Rewards, etc. In one aspect, the metadata associated with any derived member database (data cube, data mart etc.) is methodically and/or automatically absorbed into the MDR using one of database entity ID and base entity ID of the MDR. For example, the system only observes the metadata of the source database once or continuously, but the metadata of a derived member database such as a data cube that is built off of the source database is automatically integrated into the MDR. The base entity ID is an ID associated with a business metric or field in a database. Any member of that field, for example, "sales" has multiple values and the system may not want to capture the actual values. So where the system may not want to capture those values it may only refer to them using a base entity ID. Other database entities like state, country, products having actual number, and so forth are examples of base entity ID.

If the data source is a relational database then metadata will include information about the Database schema, the Tables, and Columns and lookup data will come from any lookup tables. If the data source is a multi-dimensional database or cube then metadata will include information about the database schema that is holding that cube, the cube itself treated as a fact table, all the dimensions and measures treated as columns entities. All members of the dimensions will represent the lookup data.

The following is one possible design for the MDR 318 to effectively capture both metadata and data entities of a variety of data assets like relational database management systems (RDBMSs), multi-dimensional database systems (MDDBs), Sampled Datamarts, etc. The MDR 318 may be envisioned as a relational database with the following tables:

MDR Entity ID: All columns or database fields and members of lookup potential tables are referred to as "Entities" within MDR 318. Entities are captured uniquely in an MDR Entity Table for each data asset. A unique record exists in this table for each column and each member of potential lookup tables. This table also captures two key columns for wiring together source member databases and derived member databases like data cubes or fractional data marts: (1) Base Entity ID: If the data asset is a source data asset then Base Entity ID will be null. If it is a derived asset then the Base Entity ID will be the same as the MDR Entity ID of its source data asset. (2) Business Term ID: This ID uniquely represents a business term that is mapped to the MDR Entities. A derived data asset, or derived member database is preferably derived from source databases and may refer to pre-computed data cubes or sample or non-sampled data marts. The metadata of a derived member database may be automatically absorbed into the MDR using one of database entity ID and base entity ID of the MDR.

MDR DataSource Metadata: In addition to unique Data Source ID, names & descriptions, this table captures information of member databases like the type of data asset (RDBMS, MDDB, etc.), connection information, etc.

MDR Table Metadata: Captures information like unique Table ID, names, descriptions, lookup type if a lookup table, etc.

MDR Column Metadata: Captures information like unique Column ID, names, descriptions, database data types like Integer, Character, Date, etc., MDR Data types like Dimension, Measures or just a basic Column, etc. Following are descriptions of key columns:

- Column ID: A unique ID representing the actual column name in a table in a given database. Same column names can therefore appear here from different tables.
- Column Name Column name as in the data source
- Column Database Data Type: Captures data types like Integer, Character, Date, etc.
- Column MDR Data Type: This data field captures meta information about the column like if is it a Dimension or Measure column of Summary Cube table or MDDB, ID column of a relational table, or a basic relational column. If it is Dimensional Column, additional information regarding the type of Dimension is captured. Possible types of Dimensions include Simple Lookup (SL), Range Lookup (RL), Simple Hierarchy (SH), Range Hierarchy (RH), etc. Please refer to glossary for detailed descriptions of these types of Dimensions. It should be obvious to those skilled in this filed that such metadata will allow the Query Governor to identify data sources that can potentially answer a user—without actually querying the physical data source. For example, first the Query Governor may query the answer catalog by first accessing the data cubes and then the data marts to answer a query.
- Column Database Primary-Foreign Key: Lastly, information about the primary and foreign keys of the data sources is also captured. This column can be a primary key or part of a composite primary key similar to information present in common Entity Relationship or ER diagrams.

MDR Member Data: Captures information like unique Member ID, Member Data Values, Member Descriptions, etc. Member Data Values and Member Descriptions can capture lookup data of lookup tables of relational databases or dimensions of data cubes. For instance, if STATE is a lookup table containing State-Code and State-Name then State-Code will be stored in Member Data Values and State-Name in Member Descriptions. Additional fields like Member Lower Limit, Member Upper Limit, and Member Parent Value can capture metadata of Range or Hierarchical Dimensions.

MDR-BusinessTerms: Captures BusinessTerm ID, names, and Business Term descriptions. By mapping Business Terms to source member databases, queries written using Business Terms can be translated to either the source or derived member databases. For example, is a sales company has one database that uses the term total_sales_amount and another database that uses the term sales_amt for essentially the same type of business data, there is a mapping that may be done in the MDR that enables the user to just use business terminology generally and the system will query the appropriate database. The mapping preferably occurs in the MDR to the underlying source database. So the MDR translates the queries to be member-specific queries or to a source database. Additional Columns like "Default Value", "Required Columns" can be added to these tables to meet specific application needs and is within the scope of this invention.

The MDR may be though of as a metadata dictionary that is used to determine which data asset can answer a query at hand. For example, the MDR may hold the metadata of the source database that was used to derive cube 1, cube 10 and cube 100. The query governor receives a response from the various cubes with regards to a query in which individual cubes respond that can answer the query. That information may also be automatically stored within the MDR—namely which data assets are responding to queries and other data associated with the query and response.

Figure 7:
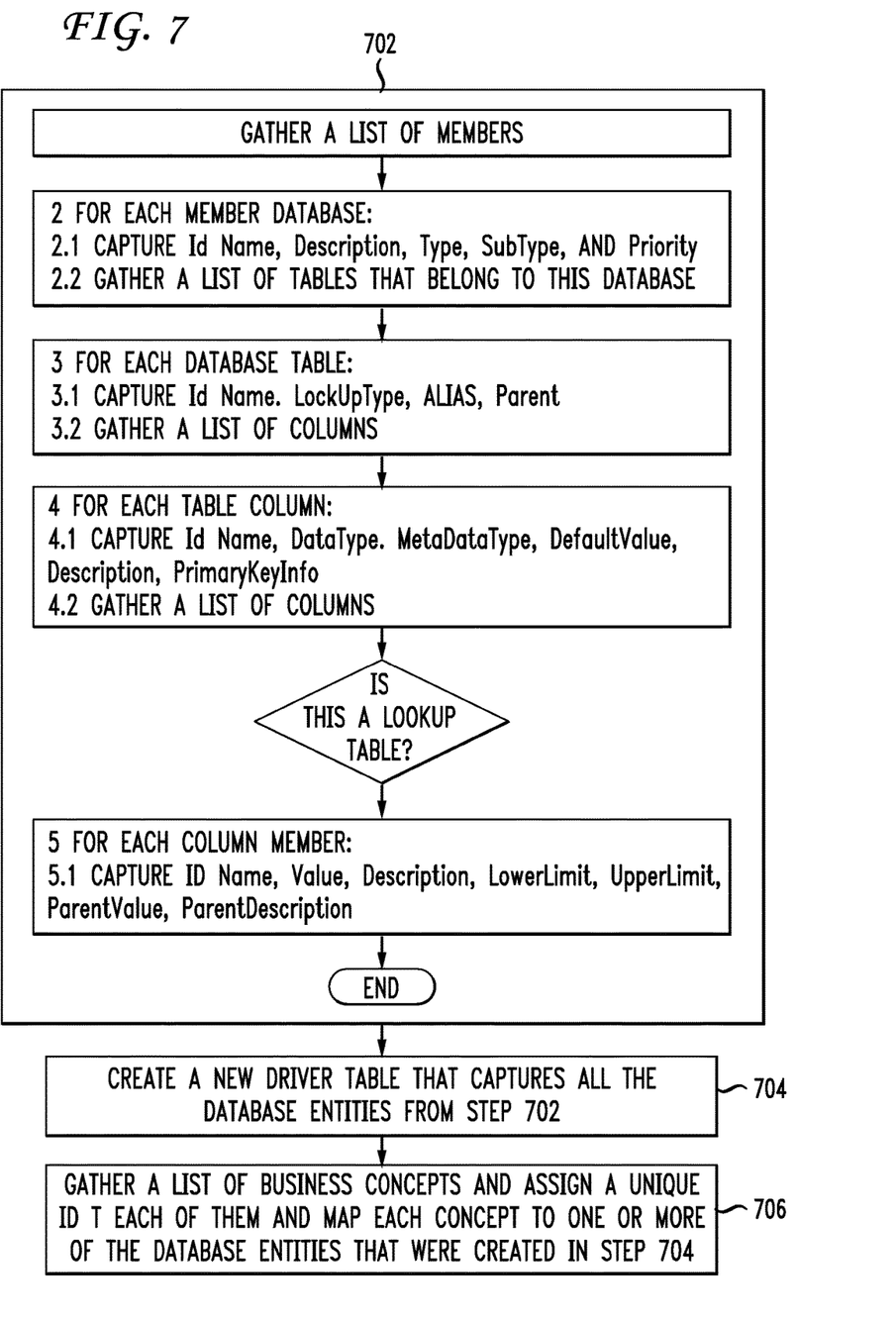
FIG. 7 illustrates a metadata repository creation process.

FIG. 7 illustrates an example MDR creation process. As shown in FIG. 7, a first step involves gathering a list of member databases. For each database, the method includes capturing various parameters such as ID, name, description, type, sub-type and priority. Further, the system gathers a list of tables that belong to each respective database. For each database table gathered in the list of tables, the method includes capturing ID, name, look-up type, alias, and parent information. Further, the process gathers a list of columns. For each table column, the method captures ID, name, data type, metadata type, default value, description and primary key info and further gathers a list of columns. The method then inquires whether this is a look-up table. For each column member and as a result of the determination of whether this system asking whether this is a look-up table, the system captures ID, value, description, lower limit, upper limit, parent value and parent description and then the initial overall step (702) ends.

Next, as shown in FIG. 7, step (704) creates a new driver table that captures all the database entities from step 702. Each database entry has a database ID, table ID, column ID and member ID. If the database is of a derived type, then the database entity would also have the ID of the source database. Step 706 includes gathering a list of business concepts and assigning a unique ID to each of them. Each concept is matched to one or more of the database entities that were created in step 704. In this manner, the metadata repository may include the necessary data to perform the mapping of a concept to one or more of the database entities.

The Hybrid database system may be constructed so as to optimize speed or to optimize accuracy, depending on the application and may be user configurable. The optimization may be accomplished optimized by a statistical approach to quantitatively determine candidates for grouping based on usage and/or database distributions and common querying patterns.

Optimization or performance tuning may be necessary when the data sets are exceptionally large or difficult to search across. The system produces results almost instantaneously from MDDBs given minimal data merging and computation after a query. The results from FxDBs will return in a fraction of time compared to that needed to query the original databases, although dependent on the size of the effective sample. Finally, even when additional samples are sourced from the original full databases, it is faster than querying completely from the entire original databases. Sourcing additional samples on demand be can more time consuming than querying MDDBs or pre-built FxDBs but addresses the challenge of accuracy of approximated results. A mechanism may be used to identify the optimal set of groups of most common user requests based on historical database usage and automatically build an Answers Catalog comprised of data cubes and data marts.

The average querying time can be improved by ensuring MDDBs and FxDBs cover most common groupings and frequent usage. Lastly, how a query is federated to the member databases also improves the average query times i.e. predetermined sequence of choosing MDDBs over FxDBs over on-demand-sampling over querying full databases or driven by load or resources associated with each of the member databases. Average querying time can further be improved through sourcing additional slices dynamically to meet a user defined accuracy level at an overall or sub-grouping level.

There is a certain benefit to slicing the source databases. As an example, assume that a first news outlet and a second news outlet each poll 2,000 people for a presidential poll, but the two outlets did not talk to each other. But this is essentially the same as two analysts in a company each are pulling a 2% sample of the census database and another analyst independently pulling a 2% sample of census database. Statistically, one 2% sample is no better than the other 2% sample. But, if a system could determine a potential commonality in the 2% samples, it may determine that there is very little difference because they could be pulling very small sample and the commonality, number of records that are common to both the samples is very small. But in effect, the two outlets are pulling essentially 4% of the database. What this disclosure enables is how the system can keep the size small by eliminating redundancy. This is done by the slicing concept.

Slicing means, for instance, if the census database were divided into 100 pieces, 100 random samples, and each sample assigned a value 1, 2, 3, 4 . . . 100. The analysts are then instructed to pull samples from 1 to n. So an analyst 1 pulls a 2% sample, and analyst 2 also pulls a 2% sample. But, this time, if they use the slicing concept, they handle it differently. They went and pulled slices 1 and 2 and the second analyst also pulled slices 1 and 2. These two slices have 100% commonality because the y are the same slices. So when we combine these two within the concept of slicing, there is a reduced size of storage requirement for two sample data marks by 50%. This concept can be followed irrespective of the number of samples or number of analysts. The slices already exist in the combined data assets on what is called the compact fractional database. If it is, then the system does not take any new records. If is not, then we will take the new records and absorb them as part of the compact database that may be used for the current query and future queries.

As an example, consider that 100 people are pulling 2% samples, the effective size of their samples is roughly 200% of the total data set. But, in the case of a compact database, it would be only 2% because all of them are pulling slices 1 and 2.

One illustration is a distribution of queries prior to performance tuning is 50% on MDDBs, 30% on FxDBs and 20% on FullDBs. Hypothetically, this may result in average query access time of 12.3 min from HyDB. With reasonable experimentation, suppose the distribution is improved to 80% on MDDBs, 15% on FxDBs, 5% on FullDBs. The average query access time from HyDB will be 3.16 min as opposed to FullDBs only or approximately 20 fold improvement in query results.

The result from the HyDB will include Query Results, data source information and confidence bounds, especially when the data source is an FxDB. Overall, this system balances query access times of MDDBs and flexibility and accuracy of full databases expediting database results superior than any of the individual member databases.

The query governor 312 takes user queries and/or user defined accuracy level as input 314 and returns query results, name of the data source, and sampling error bounds as output 316. The Query Governor, based on metadata in the HyDB metadata repository, directs the user query to a member database i.e. either full databases, FxDBs (query marts) or MDDBs (data cubes). The logic for determining which member database to be queried is described in FIG. 4. The query governor 312 optimizes query response time but using at least one of directing queries to faster, pre-computed and aggregated cubes, by sampling data marts or dynamically sourcing additional samples to meet required accuracy levels or by querying source databases based on input query, required accuracy level and performance metrics of member databases. The user may input with the query the desired level of accuracy of the results—such as a query for data with 95% accuracy.

The query governor allows for flexibility to use MDDBs when groupings match, to use FxDB when user-defined accuracy can be met, to seamlessly get additional slices to meet user defined accuracy level, and only as a last resort to query FullDB. In this way the hybrid database can offer more flexibility than any one of the member databases can individually. The hybrid database may be optimized based on a statistical approach to quantitatively determine grouping candidates or common dimensions based on historical or ongoing query usage or data distributions. The hybrid database may dynamically source additional samples or slices to meet required accuracy level of query results. In one aspect, the source databases are incorporated into the hybrid database as a member database by absorbing metadata into the MDR.

Figure 4:
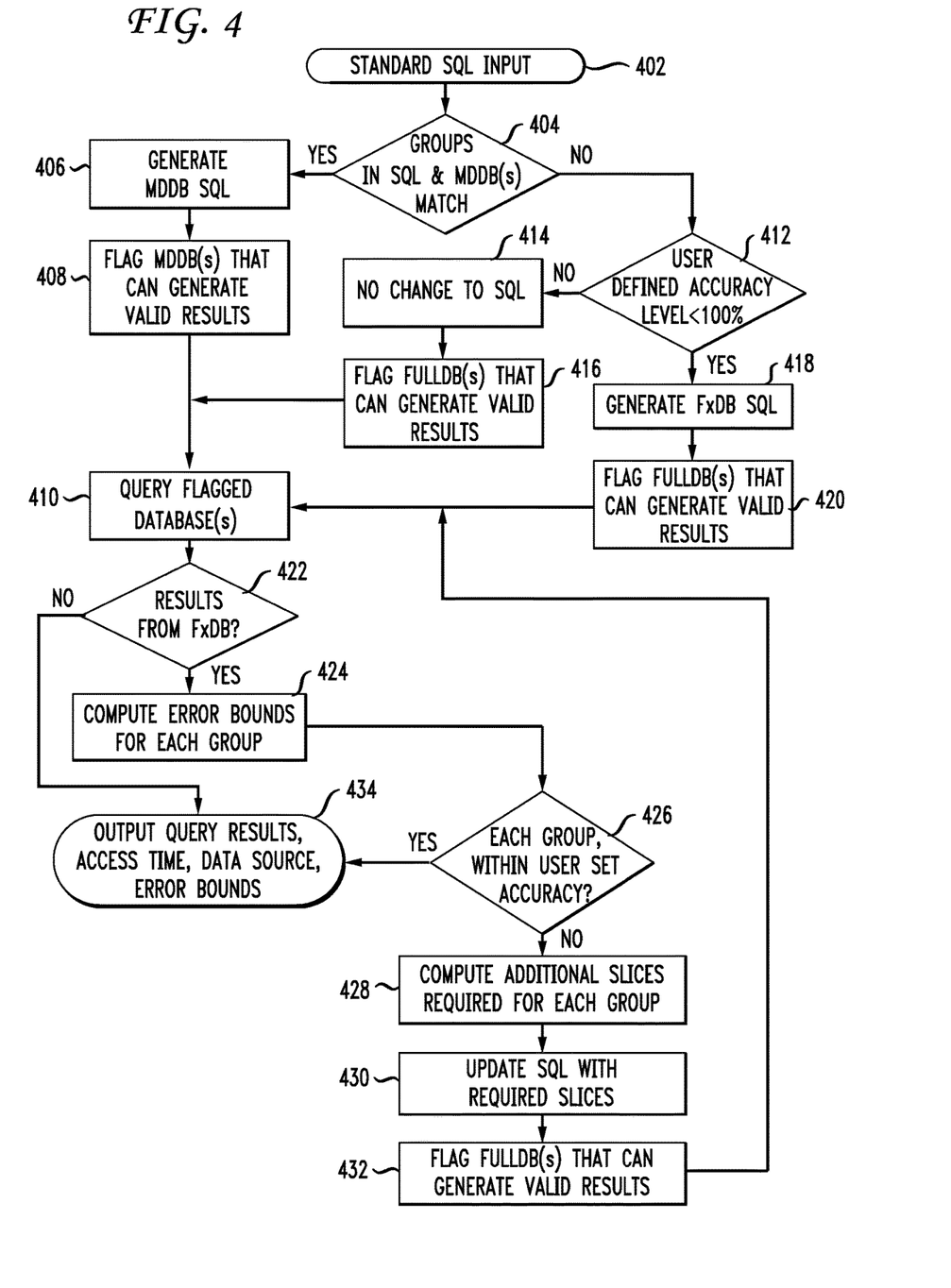
FIG. 4 illustrates how a input query is directed to a member databases based on user defined or preset accuracy level to expedite query results.

FIG. 4 illustrates an example of how a user-defined accuracy level can be directed to a member database to expedite query results. Using the query and Hybrid metadata, the Query Governor can direct the query to the appropriate member database. The following steps further illustrate the process of directing a user query (402) to the appropriate member database as shown in FIG. 4: If the groupings in the user query match that of the MDDBs (404) then use MDDBs to Generate SQL relevant to MDDBs (406), Flag the MDDB(s) that can generate valid results (408), Query Flagged MDDBs (410), and Output Query Results (434). If groupings do not match (404) and if user defined accuracy=100% (412) then use FullDBs wherein no change to user SQL is required (414), the system Flags FullDB(s) that can generate valid results (416), the system Queries Flagged MDDBs (410), and Outputs Query Results (434). If groupings do not match (404) and if user defined accuracy level <100% (412) then use FxDBs to Generate SQL relevant to FxDBs (418), Flag the FxDB(s) that can generate valid results (420), and Query Flagged FxDBs (410). If Error Bounds within user defined accuracy level across all groupings (426), from output Query Results (434). If Error Bounds NOT within user defined accuracy level across one or more of the groupings (426), then compute additional slices required to meet user defined accuracy level (428), update SQL with required Slices (430), Query FullDB (s) (432), (410), and Output Query Results with Error Bounds (434).

How the user defines a level of accuracy will at least partially determine how the system will respond and perform the query. Accuracy level may be set at a global level by an administrator when building the HyDB or may be configured to suit end-user needs. For instance, an initial setting could be 97%, which may mean that the user can tolerate a 97% accurate answer. To elaborate, if user sets 100%, a FxDB may not be used as it does not represent 100% of the database. Accuracy level is instrumental in directing user queries to the appropriate member databases or in sourcing additional samples or slices. Accuracy levels could also be determined on a per query basis. Accuracy levels could be assumed and preprogrammed for different types of queries. For example, an annual sales report could be presumed to be 100% accurate while a weekly sales-to-date report could be 85% accurate. When querying a pre-built sampled database does not meet user desired accuracy level or confidence coefficients, then additional slices can be sourced. For instance, if the user desired accuracy level is 99% and it requires an effective sample size of 5% but the pre-built sampled database has only a 3% effective sample then query can be diverted to the FullDB specifically querying 5 slices.

Figure 5:
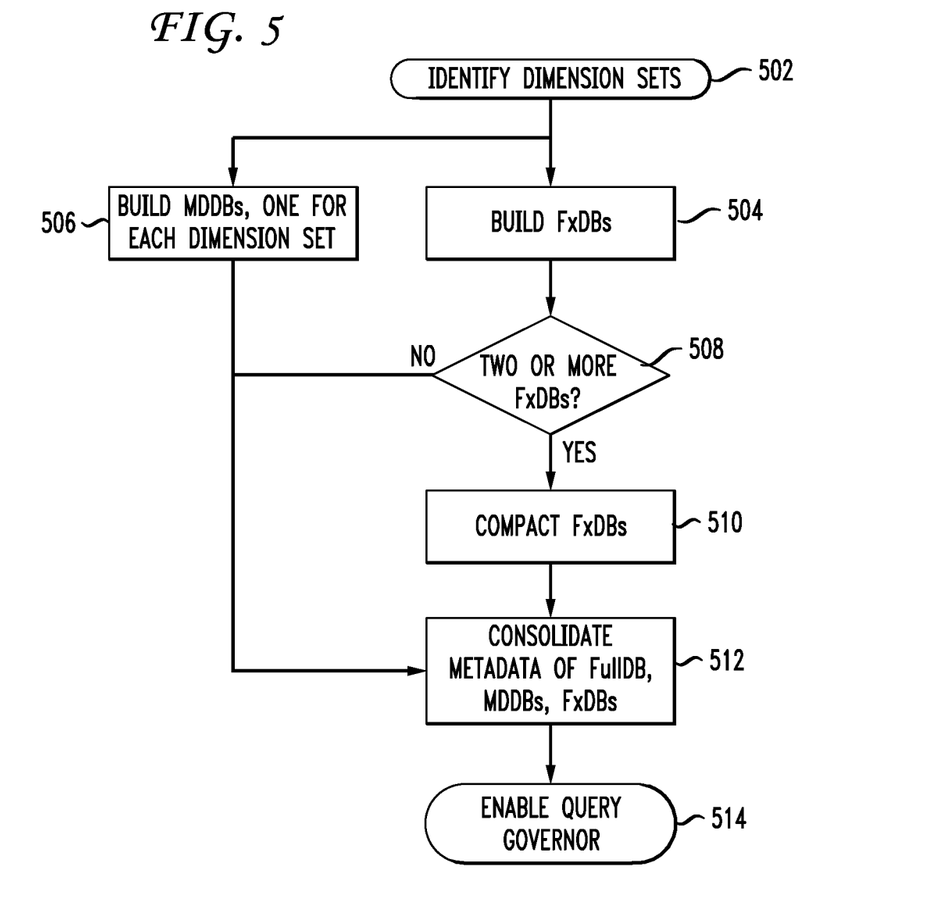
FIG. 5 illustrates an exemplary method for constructing a hybrid database.

FIG. 5 illustrates an exemplary method for constructing a hybrid database. One possible way a HyDB can be setup by an administrator or client is loading a software product and beginning the setup process. The software can then navigate the administrator through a step-by-step process of locating the original database around which a HyDB is going to be built. Then the administrator can input the dimensions sets or select an automatic option for the software to choose dimensions (502). Based on the dimension sets, MDDBs (506) and FxDBs (504) will created either immediately or as a batch job at administrator's request. If the client has some pre-existing MDDBs or FxDBs then the client may choose to use them as member databases in the HyDB instead of building new ones. Once all the member databases are built or integrated into the HyDB, the metadata of each of the member database is combined as the metadata of the HyDB (512). The system may determine if two or more FxDBs have been built (508). FI yes, then the system compacts the FxDBs (510). If not (508), then the system proceeds to step 512. The last step before users can seamlessly query the HyDB for expedited results is to enable the Query Governor (514). An example method for enabling or disabling the Query Governor could be part of the administrator control panel or a dashboard. Disabling Query Governor turns off the logic in FIG. 4 and routes the user query directly to the full database.

All the components of the HyDB i.e. member databases, Query Governor and HyDB metadata may all reside collectively or individually on one server or multiple servers. The Query Governor is not dependent on any domain, platform and database type. The Query Governor could be implemented using C, C++, Java, or any other suitable programming language.

Figure 6:
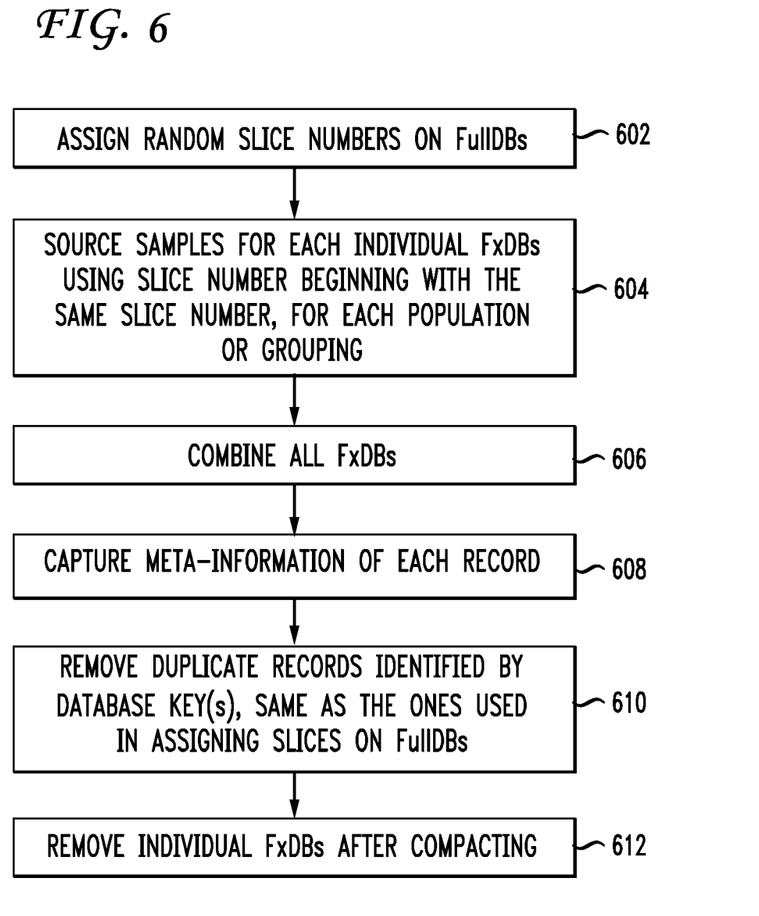
FIG. 6 illustrates an exemplary method for constructing and compacting fractional databases.

FIG. 6 illustrates an exemplary method for constructing and compacting fractional databases in step (510) of FIG. 5. Two illustrative concepts are central to compacting fractional databases: (1) slice numbering each sample in the full database, and (2) selecting samples starting from the same slice number, for example 1 and upwards. Consider that the full databases is sliced into 100 samples with slice numbers 1 to 100. If the FxDBs needs a 2% sample then slices 1 and 2 will be sourced into the FxDB1. Similarly, FxDB2 may contain Slices 1 and 2. As is evident in this example, slice numbering and sourcing slices ensures maximum overlap and therefore, maximum benefit from compact multiple FxDBs. Compacting multiple FxDBs allows the data storage requirements to decrease and can improve query access speed. Therefore, as shown in FIG. 6, the method embodiment may include the system assigning random slice numbers on full DBs (602), identifying source samples for each individual FxDBs using slice numbers beginning with the same slice number, preferably slice number 1, for each population or grouping (604), combining all FxDBs (606), capturing meta-information of each record into a lookup table (608), removing duplicate records identified by database key(s), same as the ones in assigning slices on full DBs (610) and removing individual FxDBs after compacting (612). Aspects of compacting databases include tagging original databases, sourcing samples, and compacting the sampled databases.

Tagging original database(s) with a random-sample number, or Slice, is key to both compacting multiple sampled databases and sourcing additional samples. The method of assigning a slice must be consistent across all original databases. For instance, in a consumer database with records added to the database when a new account is originated, the account origination date could be the basis for assigning the slice number i.e. if an account has slice number n and the next account originated will be n+1 up to the number of slices when it resets to 1 again. The range of the slice numbers is determined based on the percent of a database that is captured in each slice. For example, if the percent of the original database captured in a slice is 1% then there will be 100 slices, possibly ranging from 1 to 100.

Source sampling is disclosed next. The system builds individual sampled databases choosing any sampling methodology(s) to meet specific usage requirements as anyone skilled in the art can do. It is preferable that the selection of these samples from original database be based on slice numbers already assigned. When extracting slices, it is required that the first slice begin at a "set slice number", for instance Slice#1, and the remaining slices be consecutive slices. For example, if a 4% sample is required within a sub-grouping then slices 1-4 will be pulled from the same sub-grouping in the original database. Similarly, if another sub-grouping requires a 3% sample then slices 1-3 will be pulled.

Two or more databases sampled as described above can be compacted by eliminating the records that are non-unique as identified by database key information, not the full record detail. The meta information of the sub-grouping of each records should be captured in a something like lookup tables. For example, if record 101 appears in program ABC and program XYZ, then that information must be captured in the equivalent of lookup table and the record is captured only once in the compact sampled database. By querying the combination of the lookup tables and the compact database one can get the same set of records that can be obtained from the individual sampled databases.

The end of compacting multiple FxDBs is an FxDB which can contain fewer database records than the total number of records in the individual FxDBs.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code structures in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code structures for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computing devices or computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, a HyDB could be applied to a customer database for evaluating customer trends or to a software license database. Accordingly, the appended claims and their legal equivalents should only define the invention, rather than any specific examples given.

We claim:

1. A method for building an optimal group of cubes based upon historical queries to a database for answering a greatest number of future queries from a database, comprising the steps of:
  identifying a set of grouping patterns in accordance with a plurality of historical queries to the database for grouping components of the historical queries;
  defining one or more constraints to be applied to the set of grouping patterns, the one or more constraints being selected so as to optimize one or more parameters associated with the answering of a future query;
  determining an optimal set of grouping patterns in accordance with the defined constraints, each grouping pattern comprising a multi-dimensional database;
  wherein the determining of the optimal set of grouping patterns further comprises iterating the steps of:
  determining a plurality of grouping patterns or combined cubes in accordance with the plurality of historical queries and one or more knowledge modeling constructs defining a schema for data stored within the database;
  combining two or more of the plurality of grouping patterns or combined cubes that are determined to provide overlapping components so that,
  when combined into a larger combined cube, allow for a larger percentage of the historical queries to be answered in accordance with the defined constraints in a more efficient manner; and
  removing one or more the plurality of grouping patterns or combined cubes that comprise a completely defined subset of the larger combined cube in accordance with a plurality of overlapping components; and
  wherein the steps for creating the cubes are iterated until an optimal set of combined cubes is generated able to answer a greatest percentage of historical questions.

2. The method of claim 1, wherein the process of determining the optimal set of grouping patterns continues until no additional combinations of grouping patterns and combined cubes allows for a larger percentage of the historical queries to be answered.

3. The method of claim 2, wherein process of determining the optimal set of grouping patterns continues until a combined cube has reached a predefined maximum number of dimensions.

4. The method of claim 2, wherein other of the grouping patterns and combined cubes may be further combined until all combined cubes have reached the predefined maximum number of dimensions.

5. The method of claim 1, wherein the one or more constraints may be selected from the group of:
  (1) maximum number of dimensions in a dimension set or cube;
  (2) maximum number of combinations in a cube;
  (3) number of combinations, in any given derived data asset;
  (4) not more a predefined portion of the detail records of its source data assets;
  (5) number of combinations in any given derived data asset less than a predetermined number;
  (6) maximum number of dimension sets;
  (7) maximum percentage coverage of historical usage; and
  (8) storage size of overall HyDB not more than a predetermined amount of source data assets.

6. The method of claim 1, wherein the resulting group of combined cubes is employed to answer a query.

7. The method of claim 1, wherein the plurality of grouping patterns are determined in accordance with the steps of:
  inputting a set of user-defined instructions into a computer database system;
  inputting a user query into said computer database system;
  mining said computer database system for data relevant to said user query;
  creating a data set comprising said data relevant to said user query;
  aggregating data in said data set using domain metrics selected based on any of predefined and configurable rules and past user usage, wherein the aggregation comprises:
    tagging all data attributes in said data set based on database metadata and inputs from a user, wherein said data attributes comprise any of data identifications (IDs), data grouping attributes, and data measure attributes; and
    wherein the tagging process comprises inputting said user query, said database metadata for said data attributes associated with said user query, and attributes specifications; and reducing the number of the tagged data attributes in said data set by logically eliminating data attributes.

* * * * *